US010396315B2

(12) United States Patent
Zeng et al.

(10) Patent No.: US 10,396,315 B2
(45) Date of Patent: Aug. 27, 2019

(54) HOLLOW-CORE ROLLED-ELECTRODE BATTERY CELL

(71) Applicant: Microsoft Technology Licensing, LLC, Redmond, WA (US)

(72) Inventors: Dongli Zeng, Fremont, CA (US); Tzu-Yuan Lin, San Jose, CA (US); Vijayasekaran Boovaragavan, Cupertino, CA (US); John Christopher Collins, San Jose, CA (US); Michael Nikkhoo, Saratoga, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 198 days.

(21) Appl. No.: 15/396,320

(22) Filed: Dec. 30, 2016

(65) Prior Publication Data

US 2018/0190950 A1    Jul. 5, 2018

(51) Int. Cl.
| H01M 2/02 | (2006.01) |
| H01M 10/0525 | (2010.01) |
| H01M 10/0587 | (2010.01) |
| H01M 10/64 | (2014.01) |

(52) U.S. Cl.
CPC ......... *H01M 2/0275* (2013.01); *H01M 2/022* (2013.01); *H01M 2/0287* (2013.01); *H01M 10/0525* (2013.01); *H01M 10/0587* (2013.01); *H01M 10/64* (2015.04); *H01M 2220/20* (2013.01)

(58) Field of Classification Search
CPC ......... H01M 10/0525; H01M 10/0587; H01M 10/64; H01M 2220/20; H01M 2/022; H01M 2/0275; H01M 2/0287
See application file for complete search history.

(56) References Cited

U.S. PATENT DOCUMENTS

| 5,501,916 | A | 3/1996 | Teramoto et al. |
| 5,654,114 | A * | 8/1997 | Kubota ................. H01M 4/485 |
| | | | 429/231.3 |
| 6,020,084 | A | 2/2000 | Romero et al. |
| 6,187,469 | B1 | 2/2001 | Marincic et al. |
| 8,080,329 | B1 | 12/2011 | Skinlo et al. |
| 8,703,330 | B2 | 4/2014 | Phillips et al. |
| 2003/0087158 | A1 | 5/2003 | Nakagawa et al. |
| 2004/0058236 | A1 | 3/2004 | Tsukamoto et al. |
| 2007/0247786 | A1 | 10/2007 | Aamodt et al. |
| 2007/0254212 | A1 | 11/2007 | Viavattine |

(Continued)

FOREIGN PATENT DOCUMENTS

| WO | 2008125257 A1 | 10/2008 |
| WO | 2015194908 A1 | 12/2015 |

OTHER PUBLICATIONS

"International Search Report and Written opinion Issued in PCT Application No. PCT/US2017/068059", dated Mar. 27, 2018, 11 Pages.

(Continued)

*Primary Examiner* — Lingwen R Zeng
(74) *Attorney, Agent, or Firm* — Arent Fox LLP

(57) ABSTRACT

A flexible, jelly-roll type battery cell with a hollow core is disclosed. The battery cell includes a pair of electrodes wound together around a hollow core, a plurality of electrode tabs, each coupled to a separate one of the electrodes, and a flexible outer wrapper enclosing the pair of electrodes.

19 Claims, 6 Drawing Sheets

B-B

(56) References Cited

U.S. PATENT DOCUMENTS

| | | | |
|---|---|---|---|
| 2008/0076031 A1* | 3/2008 | Yamaguchi | H01M 10/052 |
| | | | 429/338 |
| 2010/0330421 A1 | 12/2010 | Cui et al. | |
| 2012/0114995 A1 | 5/2012 | Qiu et al. | |
| 2015/0072201 A1* | 3/2015 | Kubota | H01M 2/263 |
| | | | 429/94 |

OTHER PUBLICATIONS

Liu, et al., "Stress fields in hollow core-shell spherical electrodes of lithium ion batteries", In Proceedings of the Royal Society a Mathematical, Physical and Engineering Science, vol. 470, Issue 2172, Oct. 8, 2014, 4 pages.

\* cited by examiner

A-A

B-B

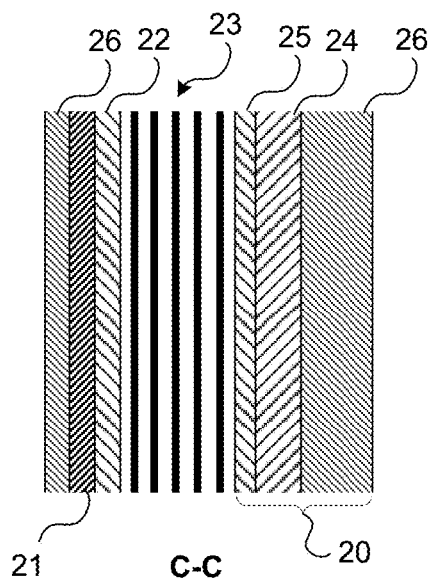
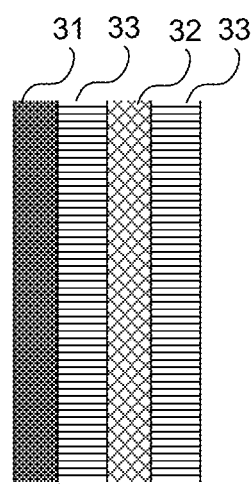
FIG. 3 FIG. 4
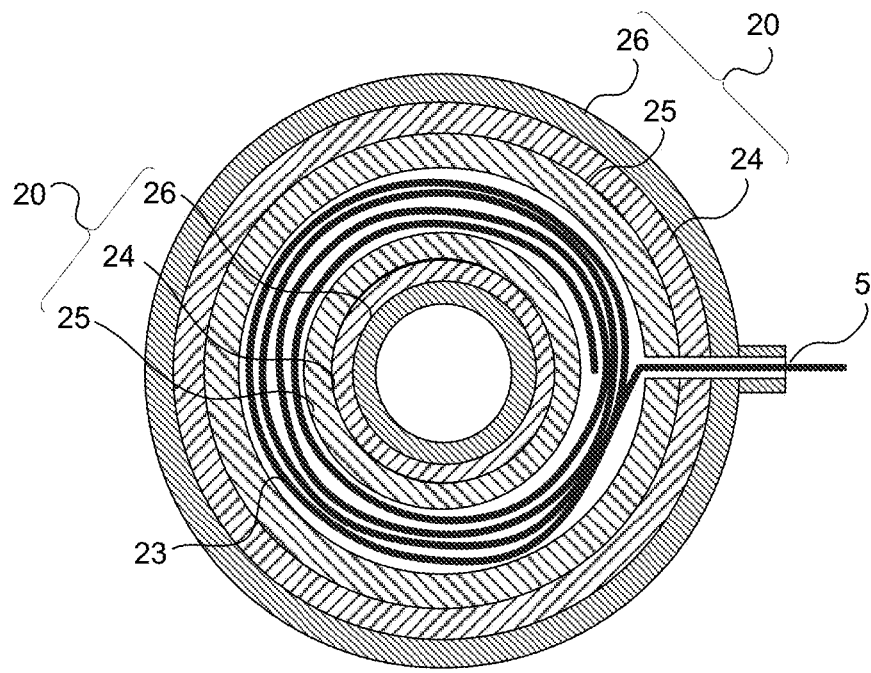
B-B
FIG. 5

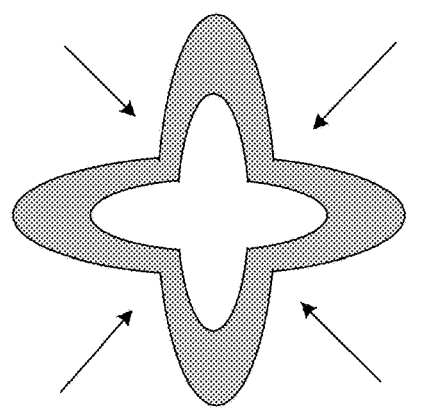
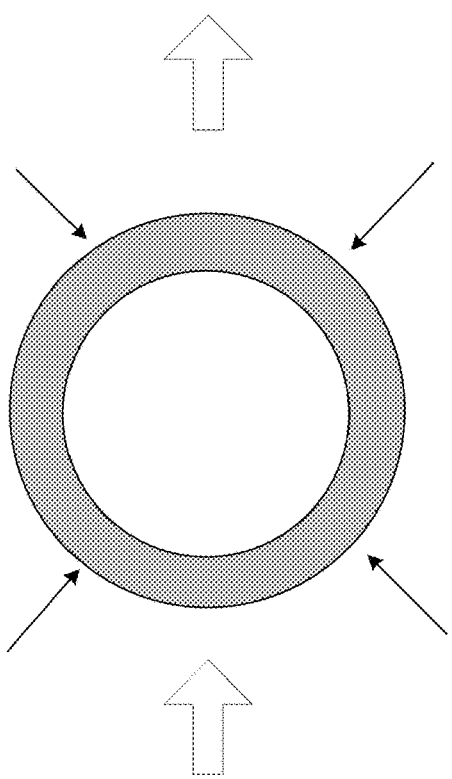
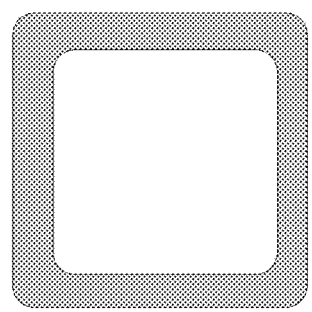
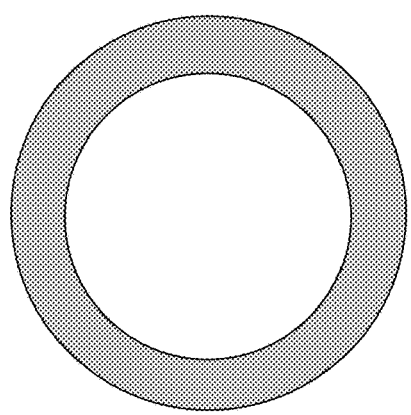
FIG. 7A
FIG. 7B

US 10,396,315 B2

HOLLOW-CORE ROLLED-ELECTRODE BATTERY CELL

BACKGROUND

One technique used in the design and manufacture of certain types of battery cells, such as rechargeable lithium-ion ("Li-ion") cells, is the so-called "jelly roll" technique. This technique involves winding two thin, flat metal sheets that form the anode and cathode electrodes of the battery cell around a spindle or mandrel, with a thin, flat insulative layer between them, to form an electrode roll (the so-called "jelly roll"). A conductive terminal is bonded (e.g., welded) to each electrode to provide an external terminal of the battery cell. The electrode roll is often pressed into a flatter shape before enclosing it in a casing.

SUMMARY

Introduced here are a jelly-roll type battery cell that has a hollow core and no rigid outer casing, and a method of making such a battery cell. The battery cell in at least some embodiments comprises a pair of electrodes wound together around a hollow core, a plurality of electrode tabs, each coupled to a separate one of the electrodes, and a flexible outer wrapper enclosing the pair of electrodes.

Other aspects of the technique will be apparent from the accompanying figures and detailed description.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

One or more embodiments of the present disclosure are illustrated by way of example and not limitation in the figures of the accompanying drawings, in which like references indicate similar elements.

FIG. 3 shows cross-section C-C from FIG. 2A.

FIG. 4 shows a cross-section of a single winding layer of the electrode pair.

FIG. 5 shows in cross-section an embodiment of a hollow-core jelly-roll type battery cell without a rigid core.

FIG. 7A illustrates how a hollow-core battery with a star-shaped cross-section can be produced from a cell with a circular cross-section.

FIG. 7B illustrates a hollow-core battery cell with a substantially square cross-section.

DETAILED DESCRIPTION

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

It is desirable to have battery cells with various different form factors, to better conform to the various different types of products in which they may be used. For example, it may be desirable to have a rechargeable (e.g., Li-ion) battery cell with a hollow core. A hollow-core battery may be desirable, for example, to improve space utilization within the end product and/or to reduce the weight of the product. For example, in drones, a high capacity battery is often required, and most of the internal volume of the drone typically is taken by the batteries. Efficient space utilization is therefore very important for such applications. Introduced here, therefore, is a jelly-roll type rechargeable battery cell that has a hollow core and no rigid outer casing. Other benefits of the hollow-core battery cell include improved thermal management during peak power operations due to additional surface area and airflow produced by the hollow core. Additionally, the technique introduced here provides industrial design flexibility by allowing new battery cell form factors to be achieved using existing manufacturing processes.

Figure 1A:
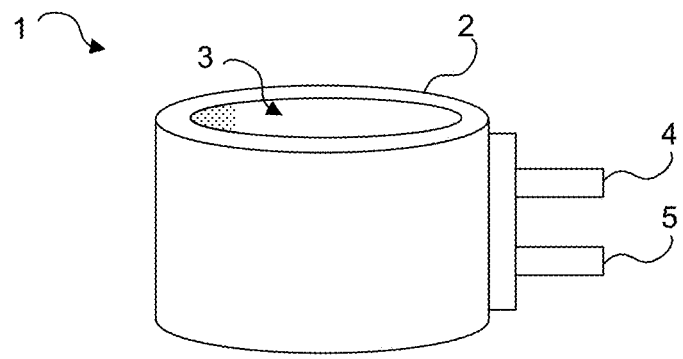
FIG. 1A shows a first perspective view of the outer envelope of a hollow-core, jelly-roll type battery cell.
Figure 1B:
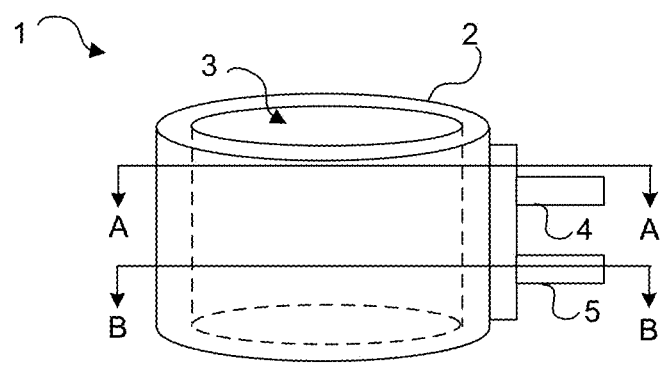
FIG. 1B shows a second perspective view of the outer envelope of a hollow-core, jelly-roll type battery cell.

FIGS. 1A and 1B show two views of the outer envelope of a hollow-core jelly-roll type battery cell 1 according to the technique introduced here. For purposes of description it is assumed that the battery cell 1 is a Li-ion cell. The battery cell 1 has a cell body 2 enclosed in a flexible wrapper, and has a hollow core 3. Two electrode tabs 4 and 5 protrude from the wrapper and are coupled respectively the anode and cathode (not shown) of the battery cell 1. In at least some embodiments, the body 2 of the battery cell 1 has a rigid inner core (not shown) but has no rigid outer casing. In other embodiments, the battery cell lacks even a rigid inner core.

Figure 2A:
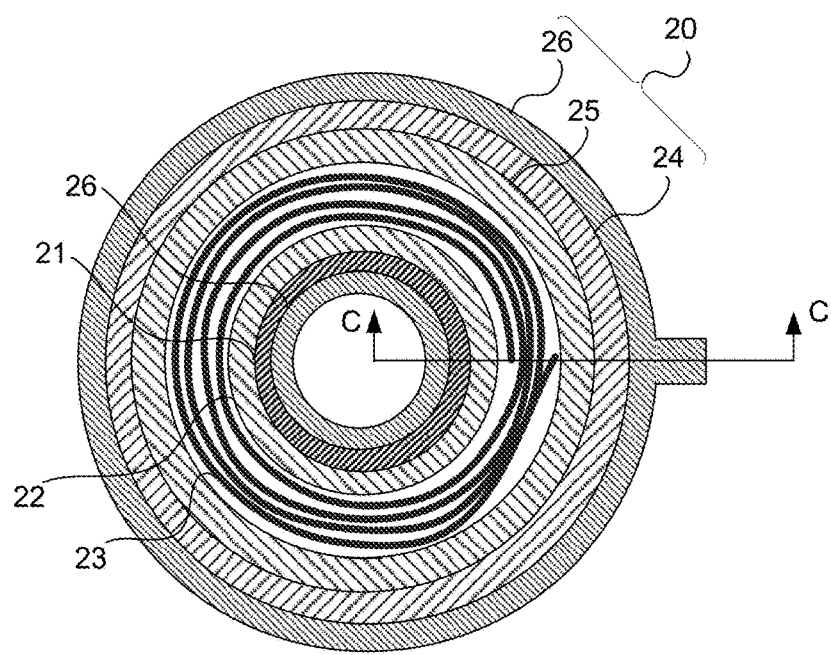
FIG. 2A shows cross section A-A from FIG. 1B, according to at least one embodiment.
Figure 2B:
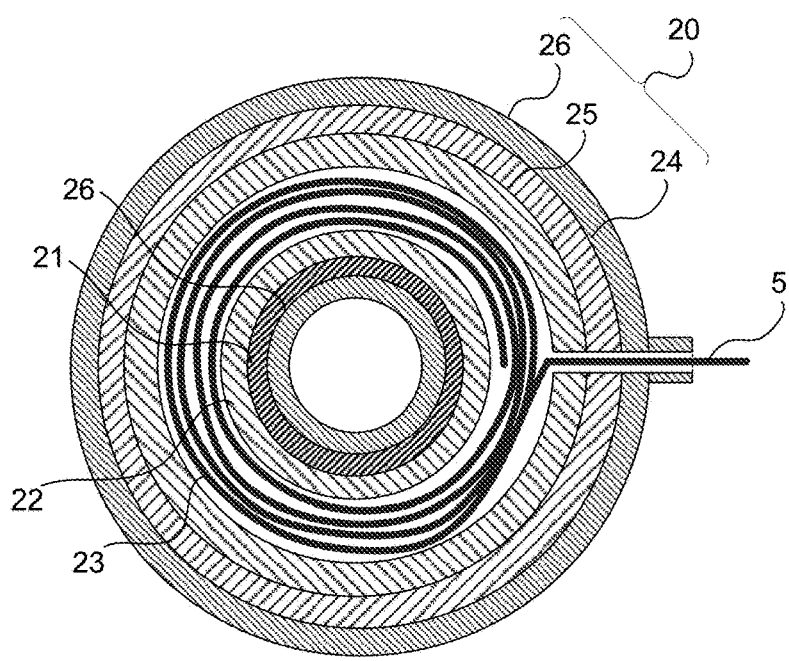
FIG. 2B shows cross section B-B from FIG. 1B, according to at least one embodiment.
Figure 6A:
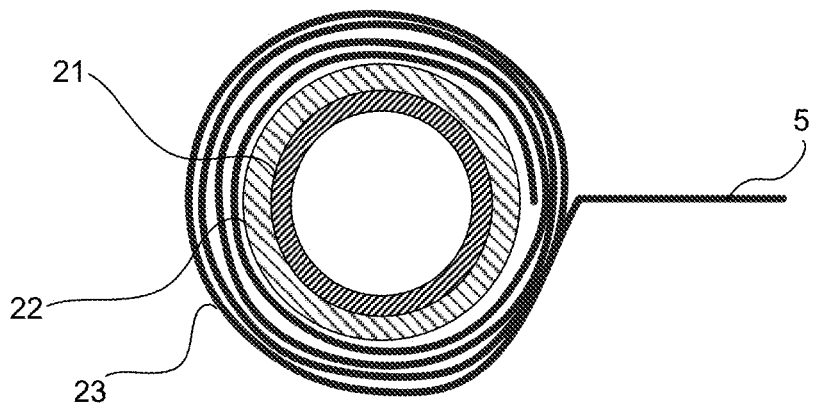
FIG. 6A shows a partial hollow-core battery cell during assembly, after the electrodes have been wound around the core.
Figure 6B:
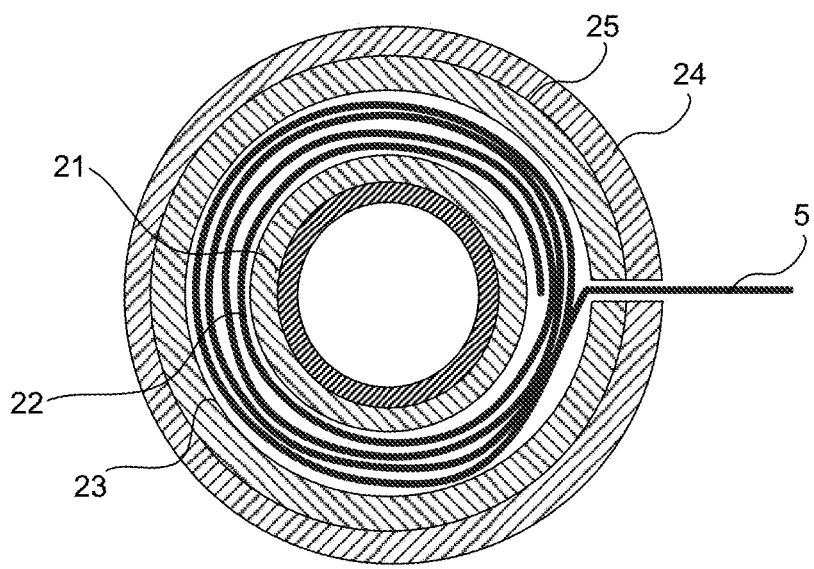
FIG. 6B shows a partial hollow-core battery cell during assembly, after the flexible wrapper has been wrapped around the electrodes.

FIG. 2A shows cross section A-A from FIG. 1B, while FIG. 2B shows cross section B-B from FIG. 1B, according to at least one embodiment. Note that FIGS. 2A through 7B are not drawn to scale. Note in particular, and for example, that in an actual battery cell the volume occupied by the packaging layers would be much less than the volume occupied by the electrodes. In the illustrated embodiment, rigidity is provided by a hollow cylindrical core 21, which may be stainless steel, for example, or another rigid material, an outer surface of which is coated with a layer of polymer 22, such as polypropylene. An electrode pair (anode and cathode, not shown separately) 23 separated by an insulative layer (not shown) is then wound around the polymer-coated stainless steel layer 21, as shown in FIG. 6A. Note that in a real implementation, the electrode pair 23 may have a greater or smaller number of windings around the core than that which is illustrated in FIGS. 2A, 2B and 3. A flexible wrapper 20 is then wrapped around the electrode pair, as shown in FIG. 6B. The flexible wrapper 20 may have multiple layers as shown, such as an outer layer 26 of nylon and a middle layer 24 of laminated aluminum foil, where an inner surface of the aluminum foil layer 24 is coated with a polymer layer 25, such as polypropylene. The polymer layers 22 and 25 are used to seal the flexible wrapper to the rigid core 21. FIG. 2B further shows the electrode tab 5 (which is coupled to the anode or cathode) protruding through the flexible wrapper 24 and protective enclosure 26.

FIG. 3 shows cross-section C-C from FIG. 2A. FIG. 4 shows a cross-section of a single winding layer of the electrode pair 23, in the same plane as that of FIG. 3 but at an enlarged scale, showing the anode 31, cathode 32 and insulative separator layers 33.

In some embodiments, the rigid core is only used during fabrication of the battery cell and is removed prior to use of the battery cell. This is possible because in at least some embodiments the electrodes themselves can provide sufficient (minimal) rigidity for the battery cell (depending on, for example, the number of windings), which may be sufficient for many applications. Accordingly, the rigid core may be removed during the fabrication process. FIG. 5 shows in cross-section an embodiment of a battery cell similar to that of FIG. 2B, but without a rigid core. Instead, the rigid core is replaced with the flexible wrapper 20 (comprising, e.g., nylon outer layer 26, laminated aluminum foil layer 24 coated with polymer layer 25 (e.g., polypropylene)). Additionally, the absence of a rigid inner core or a rigid outer casing allows a battery cell to have an irregular, i.e., non-circular cross-section. For example, it may be desirable for a battery cell to have a star-shaped cross-section. Such a shape can be produced by applying external pressure on the external surface of the cell at certain points along its external surface, directed toward the center of the cross-section. FIG. 7A illustrates how a star-shaped cross-section can be produced from a circular cross-section in this manner. Other shapes for a hollow-core battery cell are also possible, such as a square or rectangle, as shown in FIG. 7B. Further, the battery cell does not have to be symmetrical about its winding axis as shown in the examples of FIGS. 7A and 7B; that is, a hollow-core jelly-roll type battery cell such as described herein can have a shape that has an asymmetrical cross-section, at least in a plane perpendicular to its winding axis.

Various techniques can be used to fabricate a battery cell according to the above-described techniques. For example, stainless steel or aluminum sheets can be coated with polypropylene for both support and inner surface packaging and outer surface packaging. In that case, a long stainless steel pipe with polypropylene coating can be produced before-hand and then sliced to the desired length during production (e.g., after the electrode layers have been wrapped around it). The inner surface stainless steel packaging can have pre-formed shape to fit the electrodes and jelly-roll body.

Alternatively, a stainless steel sheet can be coated with polypropylene as core support and inner surface packaging, and a regular aluminum foil pouch can be used as outer surface packaging. As yet another alternative, aluminum pouch material with a central region reinforced to provide structure support can be used as the inner surface packaging, and regular aluminum pouch material can be used as outer surface packaging. Laser welding can be used to seal the outer enclosure. Alternatively, sealing can be accomplished by application of heat to the polymer layers to cause them to stick together.

Figure 8:
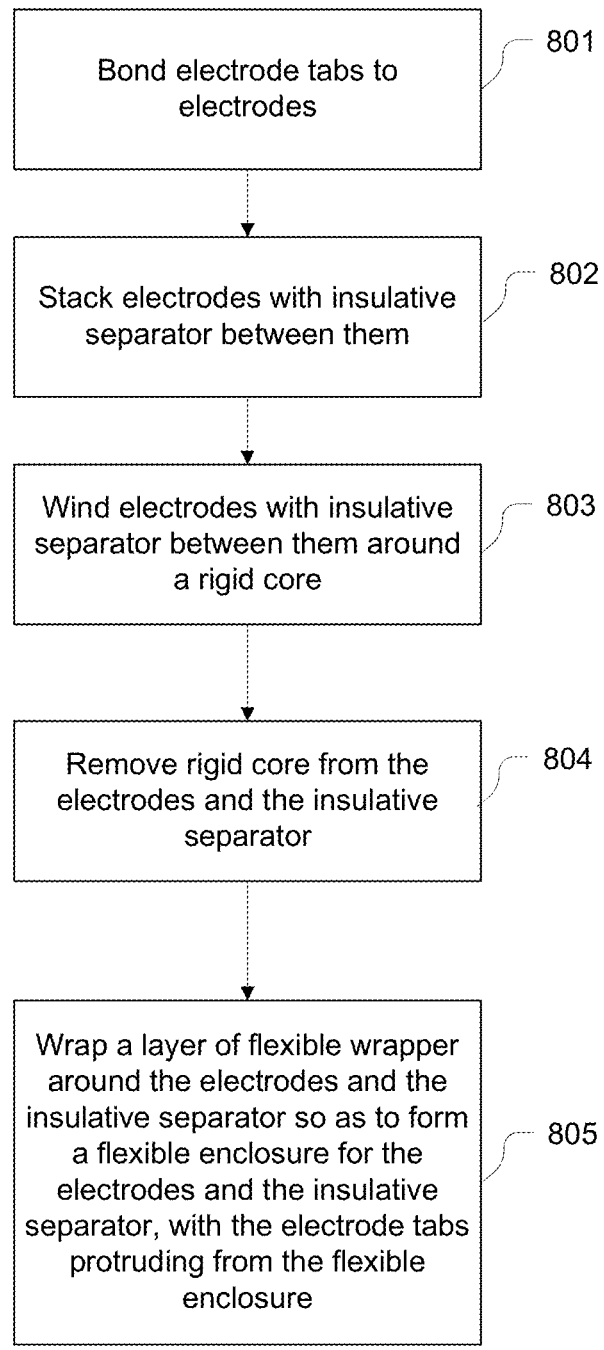
FIG. 8 shows an example of a process for fabricating a hollow-core battery cell with no rigid core or rigid outer casing.

FIG. 8 shows an example of one particular process for fabricating a battery cell according to a particular embodiment, and more specifically, a process for fabricating a hollow-core battery cell with no rigid core or rigid outer casing. The process begins a step 801 with bonding the electrode tabs to the electrode layers (anode and cathode). Next, at step 802 the electrode layers (sheets) are stacked on top of one another with the insulative separator layer between them to form an electrode pair. The electrode pair (including insulative separator) is then wound around a rigid core, such as a stainless steel pipe. The rigid core is then removed from the electrode pair. A layer of flexible wrapper is then wrapper around the electrodes and the insulative separator so as to form a flexible enclosure for the electrodes and insulative separator and is sealed, with the electrode tabs protruding from the flexible enclosure. The electrodes may be cut into smaller units before wrapping with the flexible enclosure if desired, as described above.

EXAMPLES OF CERTAIN EMBODIMENTS

Certain embodiments of the technology introduced herein are summarized in the following numbered examples:

1. A battery cell comprising: a pair of electrodes wound together around a hollow core; a plurality of electrode tabs, each coupled to a separate one of the electrodes; and a flexible outer wrapper enclosing the pair of electrodes, each of the electrode tabs protruding beyond an outer surface of the flexible outer wrapper, wherein the battery cell has no rigid outer casing.

2. A battery cell as recited in example 1, wherein the hollow core is flexible.

3. A battery cell as recited in example 1 or example 2, wherein the hollow core comprises aluminum foil.

4. A battery cell as recited in example 1, wherein the hollow core is rigid.

5. A battery cell as recited in any of examples 1 through 4, wherein the hollow core comprises stainless steel.

6. A battery cell as recited in any of examples 1 through 5, wherein the hollow core is cylindrical.

7. A battery cell as recited in any of examples 1 through 6, wherein the flexible outer wrapper comprises aluminum foil.

8. A battery cell as recited in any of examples 1 through 7, wherein the flexible outer wrapper comprises laminated aluminum foil.

9. A battery cell as recited in any of examples 1 through 8, further comprising a polymer layer coated on an outer surface of the hollow core.

10. A battery cell as recited in any of examples 1 through 9 wherein the flexible outer wrapper comprises a nylon outer layer, a laminated aluminum foil layer, and a polymer layer coated on an inner surface of the laminated aluminum foil layer.

11. A battery cell as recited in any of examples 1 through 10, wherein the pair of electrodes are wound about a winding axis, and wherein the battery cell has a substantially circular outer cross-section in a plane that passes through the electrodes perpendicular to the winding axis.

12. A battery cell as recited in any of examples 1 through 11, wherein the pair of electrodes are wound about a winding axis, and wherein the battery cell has a noncircular outer cross-section in a plane that passes through the electrodes perpendicular to the winding axis.

13. A battery cell as recited in any of examples 1 through 12, wherein the pair of electrodes are wound about a winding axis, and wherein the battery cell has a noncircular, curved outer cross-section in a plane that passes through the electrodes perpendicular to the winding axis.

14. A battery cell as recited in any of examples 1 through 13, wherein the pair of electrodes are wound about a winding axis, and wherein the battery cell has a star-shaped outer cross-section in a plane that passes through the electrodes perpendicular to the winding axis.

15. A battery cell comprising: a rigid cylindrical core with a ring-shaped cross-section; a first polymer layer coated on an outer surface of the rigid cylindrical core; a pair of electrodes of opposite polarity and an insulative separator disposed between the electrodes, wound together around the outer surface of the rigid cylindrical core coated with the polymer layer; a flexible wrapper enclosing the pair of electrodes; and a plurality of electrode tabs, each coupled to a separate one of the electrodes and protruding from the flexible wrapper; wherein the battery cell has no rigid outer casing.

16. A battery cell as recited in example 15, wherein the flexible wrapper comprises laminated aluminum foil.

17. A battery cell as recited in example 15 or 16, wherein the rigid cylindrical core comprises polymer-coated stainless steel.

18. A battery cell as recited in any of examples 15 through 17, wherein the pair of electrodes are wound about a winding axis, and wherein the battery cell has a substantially circular outer cross-section in a plane that passes through the electrodes perpendicular to the winding axis.

19. A battery cell as recited in any of examples 15 through 18, wherein the pair of electrodes are wound about a winding axis, and wherein the battery cell has a noncircular, curved outer cross-section in a plane that passes through the electrodes perpendicular to the winding axis.

20. A method of fabricating a battery cell, the method comprising: winding a pair of electrodes, with an insulative separator disposed therebetween, around a rigid core, each of the electrodes having a separate one of a plurality of electrode tabs bonded thereto; removing the rigid core from the electrodes and the insulative separator; and wrapping a layer of flexible wrapper around the electrodes and the insulative separator so as to form a flexible enclosure for the electrodes and the insulative separator, with the electrode tabs protruding from the flexible enclosure, wherein the battery cell has no rigid outer casing.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A battery cell comprising:
   a pair of electrodes wound together around a hollow core;
   a plurality of electrode tabs, each coupled to a separate one of the electrodes; and
   a flexible outer wrapper enclosing the pair of electrodes, the flexible outer wrapper forming openings corresponding to the hollow core, and each of the plurality of electrode tabs radially protruding through an outer surface of the flexible outer wrapper.

2. The battery cell as recited in claim 1, wherein the hollow core is flexible.

3. The battery cell as recited in claim 2, wherein the hollow core comprises aluminum foil.

4. The battery cell as recited in claim 1, wherein the hollow core is cylindrical.

5. The battery cell as recited in claim 1, wherein the flexible outer wrapper comprises aluminum foil.

6. The battery cell as recited in claim 1, wherein the flexible outer wrapper comprises laminated aluminum foil.

7. The battery cell as recited in claim 1, further comprising a polymer layer coated on an outer surface of the hollow core.

8. The battery cell as recited in claim 1, wherein the flexible outer wrapper comprises a nylon outer layer, a laminated aluminum foil layer, and a polymer layer coated on an inner surface of the laminated aluminum foil layer.

9. The battery cell as recited in claim 1, wherein the pair of electrodes are wound about a winding axis, and wherein the battery cell has a substantially circular outer cross-section in a plane that passes through the electrodes perpendicular to the winding axis.

10. The battery cell as recited in claim 1, wherein the pair of electrodes are wound about a winding axis, and wherein the battery cell has a noncircular outer cross-section in a plane that passes through the electrodes perpendicular to the winding axis.

11. The battery cell as recited in claim 1, wherein the pair of electrodes are wound about a winding axis, and wherein the battery cell has a noncircular, curved outer cross-section in a plane that passes through the electrodes perpendicular to the winding axis.

12. The battery cell as recited in claim 1, wherein the pair of electrodes are wound about a winding axis, and wherein the battery cell has a star-shaped outer cross-section in a plane that passes through the electrodes perpendicular to the winding axis.

13. A battery cell comprising:
   a rigid cylindrical core with a ring-shaped cross-section;
   a first polymer layer coated on an outer surface of the rigid cylindrical core;
   a pair of electrodes of opposite polarity and an insulative separator disposed between the electrodes, wound together around the outer surface of the rigid cylindrical core coated with the first polymer layer;
   a flexible outer wrapper enclosing the pair of electrodes, the flexible outer wrapper forming openings corresponding to the rigid cylindrical core; and
   a plurality of electrode tabs, each coupled to a separate one of the electrodes and radially protruding from the flexible outer wrapper.

14. The battery cell as recited in claim 13, wherein the flexible outer wrapper comprises laminated aluminum foil.

15. The battery cell as recited in claim 13, wherein the rigid cylindrical core comprises polymer-coated stainless steel.

16. The battery cell as recited in claim 13, wherein the pair of electrodes are wound about a winding axis, and wherein the battery cell has a substantially circular outer cross-section in a plane that passes through the electrodes perpendicular to the winding axis.

17. The battery cell as recited in claim 13, wherein the pair of electrodes are wound about a winding axis, and wherein the battery cell has a noncircular, curved outer cross-section in a plane that passes through the electrodes perpendicular to the winding axis.

18. The battery cell as recited in claim 1, wherein the flexible outer wrapper and the hollow core are both shaped in one of a square, a rectangle, or an asymmetrical shape.

19. The battery cell as recited in claim 1, wherein the battery cell is flexible.

\* \* \* \* \*